Feb. 24, 1931.  E. W. FORROW  1,794,226
OVERSHOT FOR WELL FISHING
Filed March 20, 1928  2 Sheets-Sheet 1
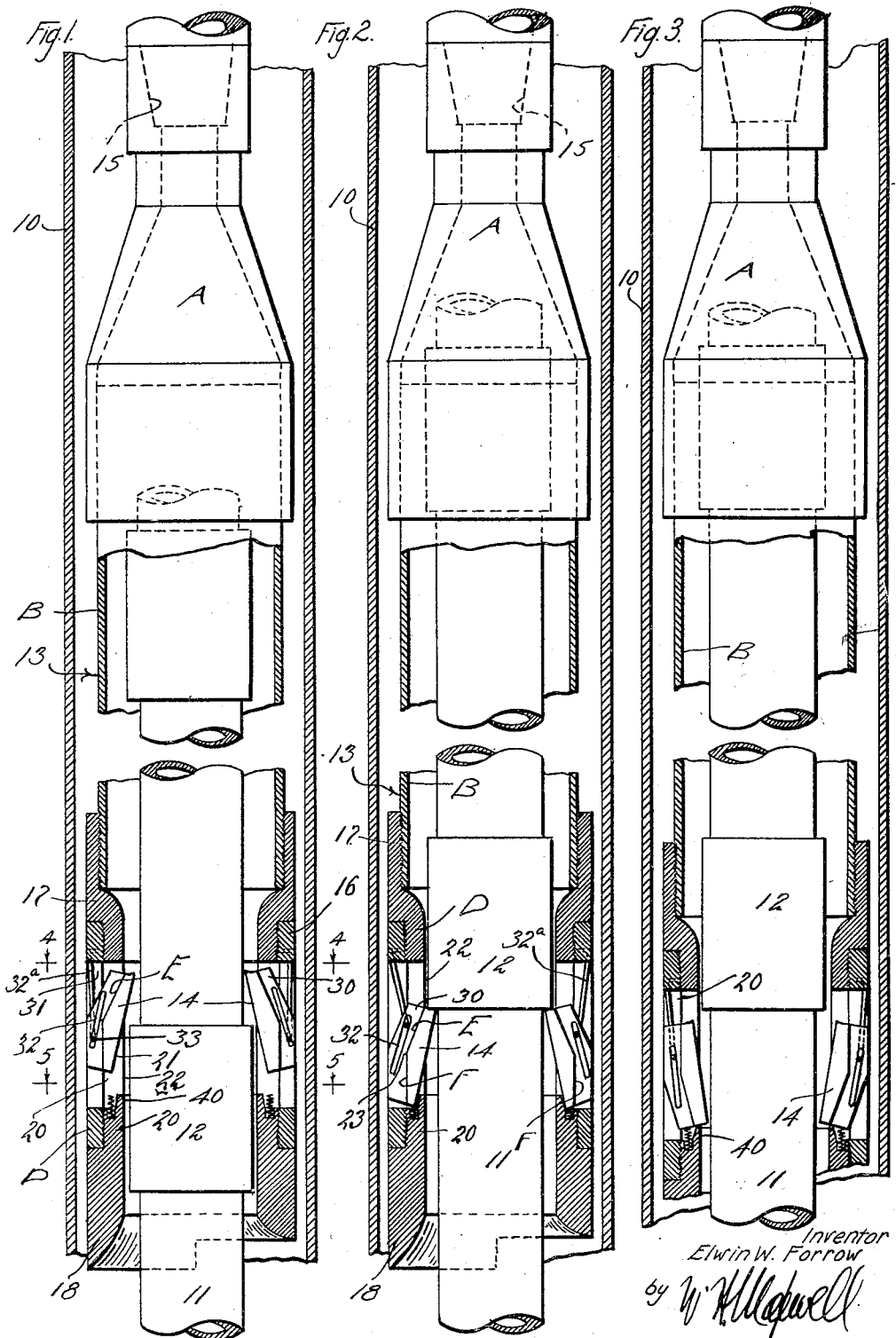

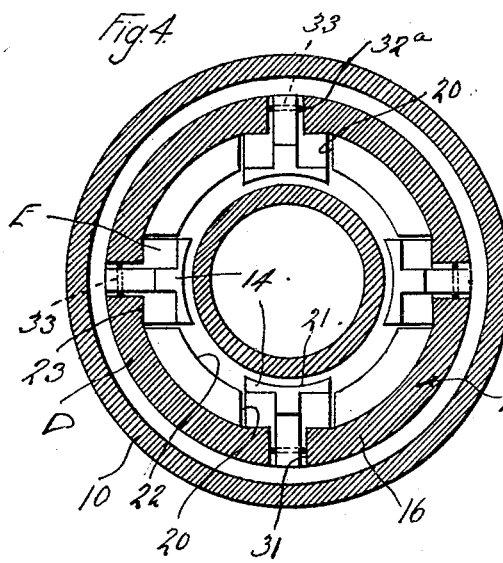
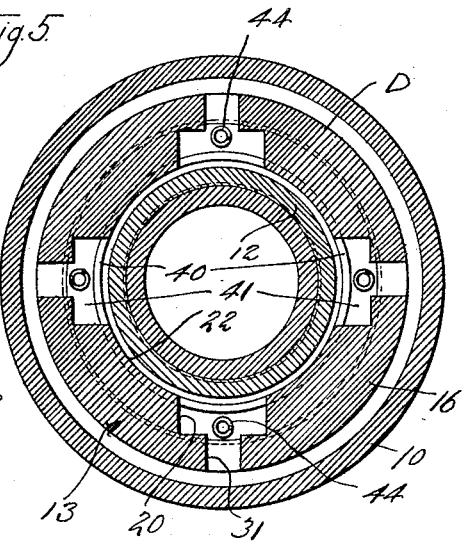
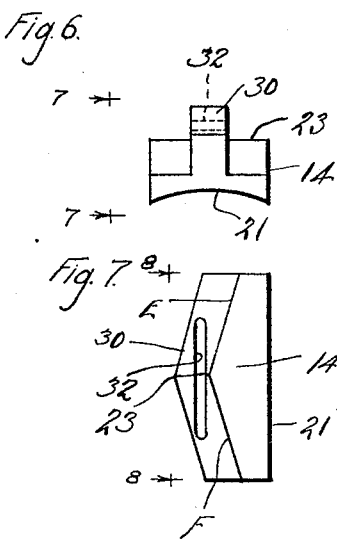
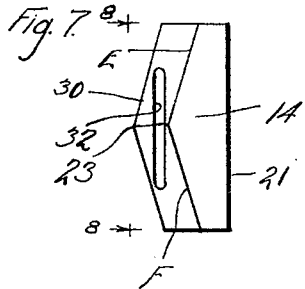
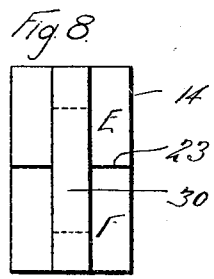
Inventor
Elwin W. Forrow
by
his Attorney Patented Feb. 24, 1931

1,794,226

UNITED STATES PATENT OFFICE

ELWIN WALTER FORROW, OF LOS ANGELES, CALIFORNIA

OVERSHOT FOR WELL FISHING

Application filed March 20, 1928. Serial No. 263,140.

This invention has to do with a well tool, and it is a general object of the invention to provide a tool for fishing or removing lost parts from a well.

In the course of drilling or producing a well, for instance, an oil well, parts become lost or broken off in the well, and it is necessary to remove or fish them out of the well before further operations can be carried on. Various devices known generally as fishing tools have been developed for this class of work and devices known generally as overshots have been used in fishing drill pipe and the like out of wells. The term overshot as I am using it includes that general class of fishing tools designed to be lowered into a well to engage under a collar coupling or other such projecting part occurring on the object to be fished from the well. Overshots generally involve a plurality of spring fingers designed to pass downwardly over a projecting part such as coupling so that they engage under such part as the tool is lifted. These spring fingers are necessarily more or less delicate and in practice give rise to trouble.

It is a general object of this invention to provide a fishing tool of improved formation and construction for performing the general operations ordinarily performed by overshots.

It is another object of this invention to provide a tool of the character mentioned in which the working or load bearing parts are rigid, sturdy parts capable of standing far more strain than spring members such as are ordinarily employed in tools of this class.

It is a further object of the invention to provide a tool of the character described wherein the working or load bearing parts are in the form of rigid latch members, which are comparatively short and which operate under compression strain.

It is a further object of this invention to provide a tool of the character described, which is releasable, allowing it to be disengaged from the lost part if such is desirable or necessary.

Another object of this invention is to provide a releasable tool of the character described, which can be repeatedly engaged and released from the lost part without being withdrawn from the well.

Another object of this invention is to provide various novel and effective features of construction and arrangement of parts in a tool of the character mentioned.

The various objects and features of the invention will be best and more fully understood from the following detailed description of a typical form and application of the invention, throughout which description reference is had to the accompanying drawings, in which:

Fig. 1 is a fragmentary sectional view of the tool provided by this invention, showing it in operating position within a well casing and in position to be passed downwardly over a coupling of a string of drill pipe located in the casing.

Fig. 2 is a view similar to Fig. 1, showing the tool in acting or working condition in which it is engaged under a collar of the drill pipe.

Fig. 3 is a view similar to Figures 1 and 2 showing the tool released after having engaged the coupling of the drill pipe and in position to be withdrawn or passed upwardly over the coupling previously engaged.

Fig. 4 is an enlarged detailed transverse sectional view taken as indicated by line 4—4 on Fig. 1.

Fig. 5 is an enlarged detailed transverse sectional view taken as indicated by line 5—5 on Fig. 1, and Figures 6, 7 and 8 are views illustrating the detailed formation of the latch construction provided by my invention.

The tool provided by this invention is intended primarily to be operated as a fishing tool for removing parts lost in a well, and therefore I have illustrated it as operating in a well casing 10. The tool may be used for fishing various objects from a well, its most obvious and common application being the fishing of pipe or tubing from a well, and therefore I have shown it in a form designed particularly to handle a drill pipe 11 in which the sections are joined by collars or couplings 12. It is to be understood, of course, that various modifications or rearrangements of parts may be made in applying or adapting the invention to various classes of use.

The tool includes, generally, a body 13 having an upper section A, a middle section B and a lower section D, and latches 14 carried by the body to engage under a part such as a coupling 12 for the removal of a drill pipe, or the like, from a well.

The body 13 may be constructed in various manners to accommodate various operating conditions and to facilitate manufacture. In the construction illustrated I have provided a sectional body in which the various parts or sections are screw threaded together. The upper section A of the body is provided for making connection with a string of drill pipe, or the like, and may be provided at its upper end with a screw threaded socket 15 to receive the pin of a tool joint, or the like. The top section A is provided with a central longitudinal opening for the passage of circulating fluid.

The middle section B of the body may be in the form of one or more lengths of tubing suitably attached to the top section A and carrying the bottom or lower section D. In the drawings I have shown the middle section B of the body in the form of a length of tubing having its upper end screw threaded into the top section A. The middle section B may be any desired length, it being preferred in practice to make it sufficiently long to receive a substantial part of the object, for instance, drill pipe to be fished from the well.

The lower section D of the body 10 is carried by or attached to the lower end of the middle section B, and has a cylindrical part 16 in which the latches 14 are mounted. In the particular construction illustrated the cylindrical part 16 is connected to the lower end of the body section B by a suitable coupling 17 and a guide shoe 18 is provided on the lower end of the part 16.

In the construction illustrated a guide shoe 18 to fit the hole being drilled is screw threaded to the lower end of the cylindrical part 16. In this case the shoe is provided at its upper end with an extension 20 that screw threads into the lower end of the tubular part 16. The lower end of the shoe 18 is preferably shaped or finished to facilitate guiding the tool over the object to be fished from the well.

The latch members 14 provided by my invention are located in the lower section D of the body, in fact, they are mounted in suitable guideways 20ª provided in the inner wall of the cylindrical part 16. In accordance with the preferred form of my invention there are several latch members provided in the body, for instance, there are two or more, and they are uniformly spaced or symmetrically disposed in the body as shown in the drawings. The several latch members 14 may be exactly the same in construction and operation, and therefore I will proceed with a detailed description of one of the latch members, it being understood that such description likewise applies to the others.

The latch member 14 is slidably carried in a vertical or longitudinally disposed guideway 20ª provided in the inner face of the cylindrical body part 16. The inner side or face 21 of the latch member is preferably of about the same curvature as the inner face or wall 22 of the part 16. The outer or rear face of the latch member is provided at a point intermediate its ends with a pivot point or fulcrum 23, which slidably engages the bottom of the guideway 20ª and about which the latch is adapted to turn in operation between the tilted positions hereinafter described. The latch is proportioned with reference to the guideway and part 16 so that its curved face 21 substantially coincides with the inner wall 22 of the part 16 when the latch is in a partially operated or neutral position where the face 21 is parallel with the longitudinal axis of the tool.

The portion E of the back of the latch above the fulcrum 23 is inclined or formed at an angle allowing the latch to tilt to a position where its lower end projects a substantial distance inwardly from the face 22 of the body part 16 while the lower portion F of the back of the latch is inclined or disposed at an angle allowing the latch to tilt in the opposite direction so that its upper end projects a substantial distance inwardly from the inner face 22 of the body part 16. These two tilted positions of the latch will be clearly understood from consideration of Figures 1 and 3 of the drawings. It will be apparent that the pitch or degree of angularity of the portions E and F will determine the extent to which the ends of the latch project from the wall 22 when in the positions mentioned.

A rib 30 is formed longitudinally on the back of the latch, preferably centrally on the back of the latch, to project into a longitudinally disposed recess 31 provided in the body part 16 at the guideway 20ª. In the particular construction illustrated the recess 31 provided to accommodate the rib 30 is in the form of a slot formed in the part 16. The rib 30 is provided with a longitudinal opening or slot 32, which extends in either direction beyond the central portion or fulcrum of the latch.

A spring is carried by the body and engages the latch for the purpose of operating it to the tilted positions above described. In the particular construction illustrated the spring has two spaced parts 32ª, which extend longitudinally in the recess 31 and have their free or projecting ends joined by a cross bar 33, which slidingly fits the slot 32 in the rib of the latch. The spring arms 32ª normally urge the cross bar 33 outwardly or away from the center of the tool, and therefore cause the latch to be turned or tilted to the positions shown in Figures 1 and 3 upon the cross bar being positioned on opposite sides of the fulcrum 23. It will be apparent that the guideway 20ª is sufficiently long with reference to the latch to allow the latch to be moved between an up position where the cross bar is in the lower end of the slot 32, causing the upper end of the latch to be moved out, and a down position where the cross bar is in the upper end of the slot, and the latch to be in.

In the case of a tool designed to engage a coupling 12 on a string of drill pipe 11, the cylindrical part 16 of the body is made to pass over the coupling 12 with only the necessary clearance and the latch is designed so that its ends engage the coupling when they project from the wall 22 as shown in Figures 1 and 3 of the drawings.

The lower end of the latch merely engages the coupling 12 for the purpose of shifting the latch longitudinally in the guideway, however, the upper end of the latch engages the coupling for the purpose of holding it, and it is therefore preferred to shape or pitch the upper end of the latch so that it effectively seats under the collar or coupling and tends to bite inwardly rather than to be displaced outwardly.

A safety means in the form of a retainer is provided in connection with the latch to hold the latch in the operating position shown in Fig. 2, so that it is not released from the coupling by the tendency of the spring arm to tilt it when the parts are in this position. This safety means may be in the form of a flange 40 projecting upwardly from the seat 41 on which the latch rests when in operating position as shown in Fig. 2. The flange is located inward of the lower end of the latch when the parts are in operating position to prevent the lower end of the latch moving outwardly until the latch has lifted a predetermined distance from the seat 41. Thus a slight lifting of the collar or coupling 12 away from the latch will not allow the latch to trip, but it is necessary for the collar to lift a substantial distance away from the latch.

Suitable means may be provided for moving the latch upwardly to become disengaged from the flange 40. For instance, a recess may be provided in the seat to carry a spring 44, which is compressed by the movement of the latch into operating position as shown in Fig. 2, and is such as to lift the latch high enough to clear the flange 40 when the coupling 12 lifts far enough away from the latch.

It is to be particularly noted that the latch is firmly seated on the shoulder or seat 41 when in operating position so that it operates under direct compression between the coupling 12 and the seat. In the particular construction illustrated, the seat for carrying the latch is formed by the upper end of the extension 20 of the shoe 18. Further, it is to be noted that in this construction the flange 40 and the spring 44 are carried by the part 20.

In operation the tool can be lowered over a string of drill pipe to a point below a coupling 12 when the latches 14 are in the up position in their guideways as shown in Fig. 1. When the latches are in this position and are lowered over a coupling 12, their upper ends, which are projecting inwardly, are depressed somewhat as the latches pass the coupling and operate to engage or project under the coupling 12 as soon as they have passed below it. When the tool has been lowered so that the latches have passed below the coupling to be engaged it is pulled upwardly so that the upper ends of the latches engage or bite under the coupling 12, and as the body of the tool is further moved upwardly the latches, being engaged under the coupling are slid downwardly in their guideways until they are back of the flange 40 and rest on the seat 41. The drill pipe 11 is then engaged so that further upward movement of the body will carry the drill pipe with it, thus making it possible to remove the drill pipe from the well through the casing 10. When it is found impossible or undesirable to pull the drill pipe 11 after it has been engaged the body 13 may be lowered enough to allow the latches 14 to be lifted beyond the flange 40 through the action of the springs 41, whereupon the spring arms 32ª immediately act to throw the latches over or to the position shown in Fig. 3. With the latches in this position, the tool can be readily slid upwardly over the collar or coupling 12, and is thus clear of the drill pipe. If it is desired to again engage a collar of the drill pipe before removing the tool from the well, relowering of the body 13 will cause the lower ends of the latches in the position shown in Fig. 3 to engage the upper end of a collar or coupling 12 so that the latches are moved upwardly in their guideways to the position shown in Fig. 1, whereupon the spring arms operate to tilt the latches to the position shown in Fig. 1. With the latches in this position, the operation of the tool can be repeated as above described.

Having described only a typical preferred form of my invention, I do not wish to limit myself to the specific details set forth, but wish to reserve to myself any changes or variations that may appear to those skilled in the art or fall within the scope of the following claims.

Having described my invention, I claim:

1. A well tool for engaging an object having a projection including a body adapted to be passed over the object, and a releasable latch slidably pivotally carried by the body operable to pass the projection in one direction and to engage it in the other direction, the latch being releasable from the projection by relative longitudinal movement between the latch and body.

2. A well tool for engaging an object having a projection, including a body adapted to be passed over the object, and a releasable latch pivotally carried by the body and movable longitudinally of the body, the latch being operable to pass the projection in one direction and to engage it in the other direction.

3. A well tool for engaging an object having a projection, including a body adapted to be passed over the object, and a releasable latch shiftably pivotally carried by the body, the latch being pivotally movable to pass the projection in one direction and to engage it in the other direction, and being releasable from the projection upon shifting longitudinally relative to the body.

4. A well tool for engaging an object having a projection including, a body adapted to be passed over the object and having a seat and a rigid latch slidably carried by the body tiltable to pass the projection in one direction and hold it in the other direction, the latch being slidable to a position where it is supported on the seat when holding the projection.

5. A well tool for engaging an object having a projection including, a body adapted to be passed over the object and having a seat, a pivoted releasable latch slidably carried by the body and operable to pass the projection in one direction and hold it in the other direction, spring means for operating the latch to release it from the projection, the latch being on the seat when holding the projection, and means operating to confine the latch to the seat.

6. A well tool for engaging an object having a projection including, a body adapted to be passed over the object and having a seat and a flange at the seat, and a latch slidably carried by the body and operable to pass the projection in one direction and hold it in the other direction, the latch being slidable to a position where it is supported on the seat and held in operating position by the flange when engaging the object through the projection.

7. A well tool for engaging an object having a projection including, a body adapted to be passed over the object, and a latch carried by the body operable between a position in which it will hold the projection when the body is moved in one direction and a position in which it will pass the projection when the body is moved in the said direction, the latch being related to the body to be slidably and pivotally operable longitudinally of the body between said positions through engagement with said projection.

8. A well tool for engaging an object having a projection including, a body adapted to be passed over the object, a latch carried by the body operable between a position in which it engages the projection when the body is moved in one direction and a position in which it moves out of engagement with the projection when the body is moved in the other direction, and means whereby the latch is operable between said positions through engagement with said projection, said means including a connection between the latch and body allowing the latch to shift longitudinally relative to the body.

9. A well tool for engaging an object having a projection including, a body adapted to be passed over the object, a latch carried by the body operable between a position in which it engages with the projection when the body is moved in one direction and a position in which it moves out of engagement with the projection when the body is moved in the other direction, and means whereby the latch is operable between said positions through engagement with said projection, said means including a single sliding and pivotal connection between the latch and body allowing the latch to shift relative to the body, and an operating spring operable to move the latch to either of said positions depending upon the position to which the latch is shifted relative to the body.

10. A well tool for engaging an object having a projection including, a body adapted to be passed over the object, a latch having a pivotal axis carried by the body operable between a position in which it engages with the projection when the body is moved in one direction and a position in which it moves out of engagement with the projection when the body is moved in the other direction, and means whereby the latch is operable between said positions through engagement with said projection, said means including a connection between the latch and body allowing the latch to shift relative to the body, and an operating spring adapted to engage the latch at opposite sides of the pivotal axis depending upon the position to which the latch is shifted relative to the body.

11. A well tool for engaging an object having a projection including, a body adapted to be passed over the object, a latch carried by the body operable between a position in which it engages with the projection when the body is moved in one direction and a position in which it moves out of engagement with the projection when the body is moved in the other direction, and means whereby the latch is operable between said positions through engagement with said projection, said means including a sliding connection between the latch and body allowing the latch to shift relative to the body.

12. A well tool for engaging an object having a projection including, a body adapted to be passed over the object, a latch carried by the body operable between a position in which it engages with the projection when the body is moved in one direction and a position in which it moves out of engagement with the projection when the body is moved in the other direction, and means whereby the latch is operable between said positions through engagement with said projection, said means including a sliding connection between the latch and body allowing the latch to shift relative to the body, and a single spring means operable to move the latch to either of said positions depending upon the position to which the latch is shifted relative to the body.

13. A well tool for engaging an object having a projection including, a body adapted to be passed over the object, a latch carried by the body operable between a position in which it engages with the projection when the body is moved in one direction and a position in which it moves out of engagement with the projection when the body is moved in the other direction, and means whereby the latch is operable between said positions through engagement with said projection, said means including a connection between the latch and body allowing the latch to shift relative to the body, and a single spring means operable to move the latch to either of said positions depending upon the position to which the latch is shifted relative to the body, the spring means including a spring arm carried by the body and a part on the arm slidably fitting a slot in the latch.

14. A well tool of the character described including a body having a guideway, a latch adapted to project from the body and having a fulcrum, the latch being carried in the guideway, and a spring carried by the body to act on the latch at opposite sides of the fulcrum upon the latch being moved in the guideway.

15. A well tool of the character described including a body having a guideway, a latch adapted to project from the body and having a fulcrum and a slotted rib on its rear side, the latch being slidable in the guideway, and a spring engaging the slot in the rib operable to tilt the latch on its fulcrum.

16. A well tool for engaging an object having a projection including, a body adapted to be passed over the object, there being a guideway in the body, a latch pivotally and shiftably operable in the guideway between a position in which it engages with the projection when the body is moved in one direction and a position in which it moves out of engagement with the projection when the body is moved in the other direction, and an operating spring operable to move the latch to either of said positions depending upon the position to which the latch is shifted relative to the body by engagement with the projection.

17. A well tool for engaging an object having a projection including, a body adapted to be passed over the object, there being a guideway in the body, a latch pivotally and shiftably mounted in the guideway operable between a position in which it engages with the projection when the body is moved in one direction and a position in which it moves out of engagement with the projection when the body is moved in the other direction, and an operating spring adapted to engage the latch at opposite sides of its pivotal axis depending upon the position to which the latch is shifted relative to the body.

18. A well tool for engaging an object having a projection including, a body adapted to be passed over the object, there being a guideway in the body, and a pivoted latch slidable in the guideway longitudinal of the body.

19. A well tool for engaging an object having a projection including, a body adapted to be passed over the object, there being a guideway in the body, a latch operable in the guideway between a position in which it engages with the projection when the body is moved in one direction and a position in which it moves out of engagement with the projection when the body is moved in the other direction, and a single spring means operable to move the latch to either of said positions depending upon the position to which the latch is shifted relative to the body.

20. A well tool for engaging an object having a projection including, a body adapted to be passed over the object, there being a guideway in the body, a latch operable in the guideway between a position in which it engages with the projection when the body is moved in one direction and a position in which it moves out of engagement with the projection when the body is moved in the other direction, and a single spring means operable to move the latch to either of said positions depending upon the position to which the latch is shifted relative to the body, the spring means including a spring arm carried by the body and a part on the arm slidably fitting a slot in the latch.

In witness that I claim the foregoing I have hereunto subscribed my name this 3rd day of March, 1928.

ELWIN WALTER FORROW.